United States Patent

[11] 3,577,660

[72] Inventor Malcolm E. Kenney
 1203 Hereford Road, Cleveland Heights,
 Ohio 44118
[21] Appl. No. 771,121
[22] Filed Oct. 28, 1968
[45] Patented May 4, 1971

[54] LINKAGE FOR MODEL-FORMING DISCS
 1 Claim, 5 Drawing Figs.
[52] U.S. Cl. ................................................. 35/18,
 46/31
[51] Int. Cl. ..................................................... G09b 23/26
[50] Field of Search ........................................... 35/18.5;
 46/23, 30, 31, 25

[56] References Cited
 UNITED STATES PATENTS
 927,499 7/1909 Davis............................. 46/30X
 2,414,716 1/1947 Carson........................... 46/31
 2,446,120 7/1948 Wiswesser..................... 35/18
 2,633,662 4/1953 Nelson........................... 46/25
 2,833,082 5/1958 Carson........................... 46/23
 3,177,611 4/1965 Beck.............................. 46/25
 FOREIGN PATENTS
 52,842 12/1966 East Germany.............. 35/18

Primary Examiner—Harland S. Skogquist
Attorney—Robillard & Byrne

ABSTRACT: An apparatus for constructing molecular models having, as atom-representing members, both single discs and interengaged mutually perpendicular double discs and, as chemical bond-representing members, hollow tubes which are frictionally received over valence-representing recessed nibs on the discs.

PATENTED MAY 4 1971

3,577,660

INVENTOR
MALCOLM E. KENNEY
BY Robillard and Byrne
ATTORNEYS

LINKAGE FOR MODEL-FORMING DISCS

The present invention relates to molecular models and more particularly relates to a linkage system for a plurality of disc members which are detachably secured into a stereochemical molecular model.

Model kits are known in which different molecules are assembled for display and study from a plurality of flat disc pieces, some of which are individually representative of certain atoms and others of which are paired in mutually perpendicular interengagement to represent in certain other atoms. Such disc model kits achieve mod molecular configuration by interconnecting the atom-representing discs and disc pairs together. Although the use of discs for molecular exhibition has vitiated the storage problem associated with the better known molecular model kits which utilize spherical balls for atom-representing members, this invention makes its contribution in providing strength, durability, and facility of assembly.

An important objective of this invention is to provide a molecular model kit which utilizes discs representing the valence state of a particular atom and having recessed tongues for retentively engaging chemical bond-representing tubular members.

Another important objective of this invention is to provide tube-receiving lugs within the peripheries of the atom-representing discs whereby breakage is reduced and aesthetic appearances are enhanced.

A further objective of the invention is to provide atom representing disc pairs which are easily assembled into mutually perpendicular relation by means of radial slots whose widths are at least as great as the thicknesses of the of the discs throughout the slot lengths are which are interlocked in place by a groove provided intermediate the length of the slot which engages with a boss or lug on the disc surface.

These and other objects of the invention will become more apparent to those skilled in the art by reference to following detailed, description when viewed in light of the accompanying drawings, wherein.

Figure 1:
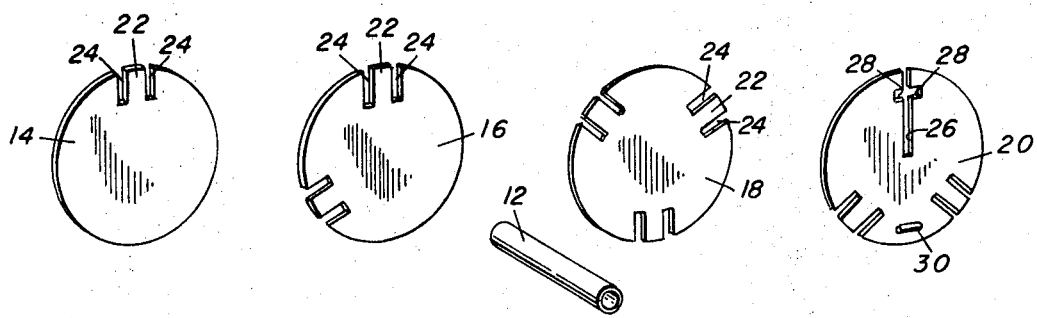
FIG. 1 is a perspective view of several of the individual components which make up the molecular model kit.

Referring now to the drawings, wherein like numerals indicate like parts, the numeral 10 indicates a grouping of several of the components parts which make up the molecular model kit. Quite obviously, the individual number of component parts required to make up a kit is arbitrary and selected to fit the number and variety of molecular models desired to be assembled. It can be seen that because of the great compactnesses of the unassembled components of the instant invention a very large number may be housed in a relatively small container.

The components viewed in FIG. 1 include a connecting tube 12 and a variety of discs 14, 16, 18 and 20. Each of the discs is made of a sturdy material such as synthetic plastic and is circular in shape with parallel planar sides. The discs have at least one recessed radial tongue or nib 22 formed by a pair of parallel cutout slots 24 in the outer periphery of the disc. The tongue 22, by being formed within the peripheral confines the disc, is not only substantially protected from any sharp bending, shearing or twisting forces during use but also maintains the storage dimensions of the discs to a minimum.

The discs 14, 16 and 18 each represents a particular atom with a the number and position of the tongues 22 in each representing the valence state and on bond angle respectively of the atom. As an example, the disc 14 is representative of the monovalent hydrogen or chlorine atom while the disc 16 is representative of the divalent oxygen atom and the disc 18 of the trivalent carbon atom. Other atoms of like valence may, of course, be represented by similar discs and can be made separately identifiable by a simple marking or color coding system. In each kit there will be several colors of each type of disc. Because they are used in many atomic representations, the 14 and 20 types normally predominate.

Figure 2:
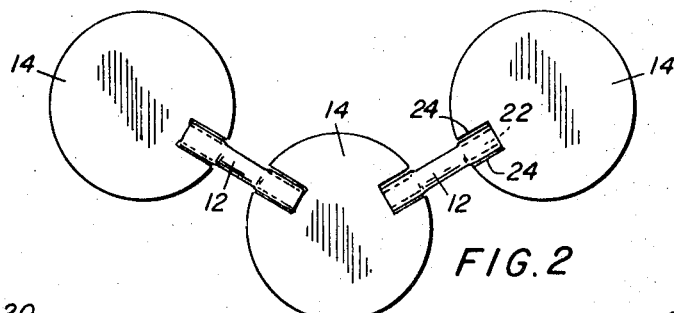
FIG. 2 is a plan view of a water molecular constructed with selected components of the molecular model kit.

The nib 22 and the cutout portions 24 are formed so that the hollow-connecting tube 12 may be forced—fitted over the end of the nib and, by friction, retentively engaged thereon. For ease of assembly to the disc it has been found that a tube of resilient plastic is used. The tube is sturdy enough to support the discs without flexing along its longitudinal axis, but elastic enough to deform for frictional receipt on a nib of slightly greater width than the inner diameter of the tube. An illustration of water molecule is shown in FIG. 2 wherein one oxygen-representing disc 16 is connected to type hydrogen-representing disc 114 by two bond-representing members 12.

The disc 18 is representative of the trivalent carbon atom such as occurs in graphite. The arrangement of single layers of graphite can easily be shown by connecting a plurality of the discs 18 together with connectors 12. It is to be noted that the nibs 22 on the carbon-representing discs 18 are spaced 120° apart in order to bond each atom to three others at 120° angles.

Figure 5:
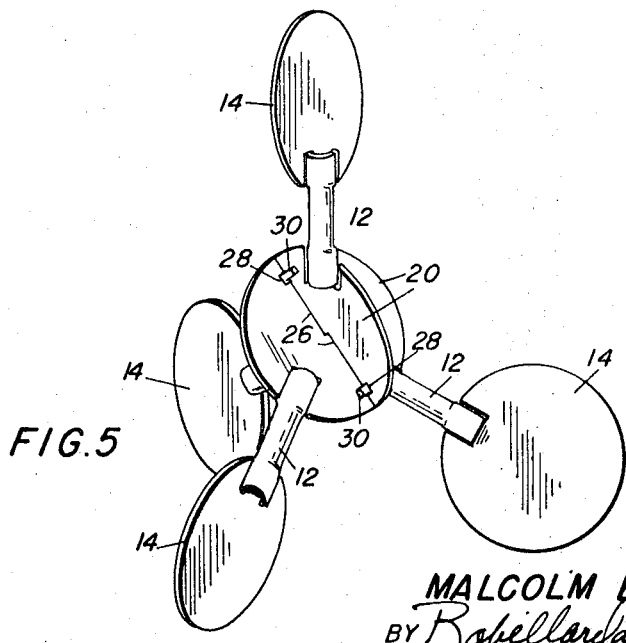
FIG. 5 is a perspective view of a methane molecule constructed with selected components of the kit.

Besides facilitating the display of molecules with subordinate atoms in a planar configuration, three-dimensional models such as the methane molecule (shown in FIG. 5) can be assembled through the use of a pair of identical discs 20. The disc 20 is formed with a slot 26 emanating at its center and extending radially outwardly to its periphery. The slot has parallel planar sides spaced-apart a distance equal to the thickness of the disc throughout its entire length except for the provision therein of an enlarged segment caused by opposed notches 28. An elongated lug 30 is provided on one surface of the disc 20 in a location whereby the length of the lug is bisected by an extension of the longitudinal axis of the radial slot 26. The lug 30 is spaced outwardly from the center of the disc the same distance as the notches 28 and has a width equal to or less than the width of the aforesaid notches. The disc 20 is also provided with two tongues 22 evenly spaced on each side of the lug 30 to form an angle of 109.5°.

Figure 3:
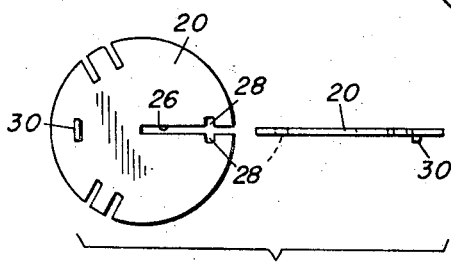
FIG. 3 is a plan view of the initial stage of assembly of discs for representing a tetrahedral atom.
Figure 4:
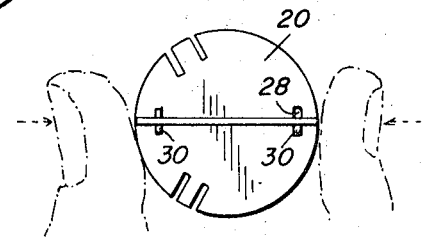
FIG. 4 is a plan view of an intermediate stage of assembly of the discs of FIG. 3.

With the structure of the disc 20 as given and with reference to the drawings, it is easy to see that by juxtaposing two of the discs in a mutually perpendicular relationship with the entrance to their slots 26 adjacent each other, the discs may be moved into mating relation by sliding the discs in the direction of the arrows shown in FIG. 3 so that each of notches 28 on one disc moves toward the lug 30 on the other disc. It can be seen that the snap-locking feature of the instant invention does not complicate the initial assembly operation. Some the slots 26 are as wide as the thickness of the discs, it is a simple matter to slide the discs together until the lug 30 of each disc abuts against the periphery adjacent to the entrance of the slot 26 of the other disc. As shown in FIG. 4, achievement of this stage in the assembly operation before the necessity of an increased amount of assembly pressure results in an already stable partial assemblage to which such increased pressure is easily applied. The relatively small size of the discs in relation to the user allows him to steady the discs by grasping the upper and lower surfaces of one disc between the thumb and forefinger of the right hand until the lugs 30 are traversed and seated in the notch 28. The discs will then be positively interlocked into a mutually perpendicular relation which resists accidental disassembly and which is achieved without bending, twisting or otherwise skillfully manipulating the two discs 20 relative to each other.

It is to be understood that the positive interlocking feature attained by the assembled discs 20 prevents any relative movement lineally or pivotally therebetween with respect to their common diametrical axis. Lineal movement in either direction along the aforesaid common axis is prevented since the lug 30, upstanding from the surface of one disc, abuts against the sides of the notch 28 on the other disc while the inner end of the slot 26 of the one abuts against the inner end of the slot of the other. On the other hand, relative pivoting of the discs about their common axis is prevented since the sides of each slot 26 are parallel planes which are spaced-apart a distance equal to the thickness of the disc and are therefore, flush against the surfaces of their disc mate. Of course, intentional disassembly can be effected in a simple and efficient manner by exerting inward axial pressure on both discs closely adjacent the entrance to their slots 26. Again, this operation is best accomplished by holding one disc in the left hand as before, and exerting the axial forces by squeezing the discs between the thumb and the fore finger of the right-hand.

The tetrahedral carbon atom represented by the interlocked discs 20 is easily developed into a methane molecule by assembly of the chemical bond representing connections 12 to the nibs 22 of both the discs 20 and the hydrogen representing discs 14. It is to be understood that the whole alkane series of hydrocarbons with their derivatives can be developed by the use of a requisite number of interlocked discs 20 whose nibs 22 result in equal tetrahedral bond angles of 109.5° and that many other basic hydrocarbon structures as well may be assembled and displayed by the components 10.

The invention which has been described represents an improvement over the known molecular model kits. The recessed tongues 22 of the atom representing components allow not only for more efficient storage but also for increased durability in usage. The snap-fitting feature in disc pairs positively locks the discs together into a stable unit which resists accidental disassembly but which greatly facilitates assembly so that a minimum of skill or strength is required. Additionally, the use of a protruding lug, rather than an additional slot arrangement does not weaken the individual discs.

In a general manner, while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. Apparatus for constructing molecular models comprising a plurality of disc means for representing selected individual atoms, said disc means comprising a single disc for representing selected individual atoms, and multiple discs for representing other selected individual atoms, said multiple discs comprising a second thin circular disc, a third thin circular disc identical to the second disc, and interengaging means formed on said second disc and said third disc for snap-fitting said second and third discs together, said interengaging means including a slot having planar parallel sides spaced-apart a distance equal to the thickness of the discs and extending outwardly from the center of each second disc and third disc to its periphery, said slot having a segment of increased width, a lug on each disc in longitudinal alignment with said slot and spaced outwardly from the center of the disc the same distance as said segment, wherein said first and second discs are rigidly interengaged in a mutually perpendicular relation when the lug of said second disc and the lug of said third disc are received in the enlarged slot segments of said third and second discs respectively, valence-representing means formed inwardly from the periphery of said disc means for representing a chemical bond, said valence-representing means comprising at least one radial tongue formed inwardly of the peripheral portion of each disc, and means connecting together the valence-representing means of selected disc means, said connecting means comprising a hollow, slender tube adapted for snug receipt at either end of said tongue.